(12) United States Patent
Park et al.

(10) Patent No.: US 6,724,981 B1
(45) Date of Patent: Apr. 20, 2004

(54) APPARATUS AND METHOD FOR TRANSFERRING DIGITAL VERSATILE DISC INFORMATION

(75) Inventors: Jong wook Park, Seoul (KR); Ju-ha Park, Yongin (KR); Dong-il Song, Suwon (KR)

(73) Assignee: Samsung Electronics Co., Ltd., Kyungki-do (JP)

( * ) Notice: Subject to any disclaimer, the term of this patent is extended or adjusted under 35 U.S.C. 154(b) by 0 days.

(21) Appl. No.: 09/518,226

(22) Filed: Mar. 2, 2000

(30) Foreign Application Priority Data

Mar. 3, 1999 (KR) .......................... 1999-6931

(51) Int. Cl.$^7$ ........................... H04N 5/91; H04N 5/781
(52) U.S. Cl. ....................................... 386/125; 386/126
(58) Field of Search .............................. 386/46, 95, 111, 386/112, 96, 104, 105, 125, 126

(56) References Cited

U.S. PATENT DOCUMENTS

| 6,211,800 B1 | * | 4/2001 | Yanagihara et al. | .......... 341/50 |
| 6,370,323 B1 | * | 4/2002 | Adolph et al. | .............. 386/104 |
| 6,504,996 B1 | * | 1/2003 | Na et al. | .................... 386/125 |

FOREIGN PATENT DOCUMENTS

| EP | 0 833 514 A2 | 4/1998 | ............ H04N/7/24 |
| JP | 10-243394 | 9/1998 | ............ H04N/7/24 |
| JP | 11-353790 | 12/1999 | ........... G11B/20/10 |

OTHER PUBLICATIONS

Fernseh–und Kino–Technik, 52$^{nd}$ year, No. Oct. 1998, p. 576 to 582.

* cited by examiner

Primary Examiner—Huy Nguyen
(74) Attorney, Agent, or Firm—Sughrue Mion, PLLC

(57) ABSTRACT

An apparatus and method for transferring digital versatile disc (DVD) information is provided. This apparatus includes a stream format converter for providing a first stream by converting the program stream format of audio and video information read from the DVD into a transport stream format. A re-encoder is included, for providing a second stream by overlaying video information read from the disc with subpicture information read from the DVD and re-encoding the overlaid information using a predetermined compression encoding scheme for image information. A stream selector is included, for selecting either the first or second stream according to the requirements of a user, the bandwidth of a transmission channel, and the information processing capability of an apparatus for receiving information, and transferring a selected stream to the apparatus for receiving information via a transmission channel. Accordingly, information obtained using a selected optimal transfer method, that is, MPEG-2 full re-encoding, MPEG-2 I picture re-encoding, DV format re-encoding, or conversion of information stored in an original DVD into an MPEG-2 TS packet, is transferred. Therefore, even if DVD information is transferred to any apparatus, it can be viewed.

22 Claims, 2 Drawing Sheets

APPARATUS AND METHOD FOR TRANSFERRING DIGITAL VERSATILE DISC INFORMATION

BACKGROUND OF THE INVENTION

1. Field of the Invention

The present invention relates to the field of digital information transmission, and more particularly, to an apparatus and method for easily transferring digital video and audio information which is stored in a digital versatile disc (DVD) to a variety of apparatuses having different transfer standards.

2. Description of the Related Art

Among large capacity recordable/reproducible recording media, DVDs store not only audio information and video information but also image information such as a subpicture. The subpicture must be overlaid onto a video signal to be displayed on a screen. Thus, other apparatuses connected to a DVD system (e.g., a DVD player) must also receive both video information and subpicture information to be able to express both the video and the subpicture. To do this, in the prior art, video information and subpicture information decoded by a video decoder and a subpicture decoder, respectively, in a DVD player are overlaid to generate mixed image information, and the mixed image information is again compressed in a moving picture expert group (MPEG) or digital video (DV) format, and then finally transferred. Alternatively, compressed video information and compressed subpicture information from the DVD player are overlaid in an apparatus which receives them, and are then displayed.

In the first method, video information stored in a DVD is decoded by an MPEG-2 video decoder and stored in a video frame memory, and the decoded video signal is again compressed and coded using a compression scheme such as MPEG-2 or DV, and then transferred as an MPEG-2 transport stream (TS) packet format. When a user wishes to view a subpicture, subpicture information is decoded by a subpicture decoder, and then the obtained bitmap image overwrites a designated portion of a video frame memory in which the decoded video signal is stored, and the mixed image is again compressed and transferred.

In the second method, video information and audio information stored in the DVD are converted from a compressed state into an MPEG-2 TS packet format, and then transferred to other apparatuses. In the meantime, subpicture information is transferred in a decoded state or in its original state from the DVD player via a special channel or may be decoded in an apparatus which receives the subpicture information in its original state. At this time, in the apparatus which receives the DVD information, decoded subpicture information and a decoded video signal are mixed and displayed on a screen.

However, in the first method of transferring image information, the compression ratio upon re-encoding to only an MPEG-2 intra (I) picture is lower than that in full MPEG-2 encoding, so that a required bandwidth greatly increases. Thus, if the bandwidth of an information transmission channel is narrow or the information processing speed of an apparatus for receiving information is not sufficient for the bandwidth and bit rate required upon re-encoding, MPEG-2 I picture transmission is impossible. Also, during re-encoding, the quality of an image is unavoidably degraded.

The second method is advantageous in that the quality of original image information, the quality of original audio information, and a transmission bandwidth can be maintained, but is disadvantageous in that a DVD player or an apparatus for receiving DVD information requires a complicated subpicture processing circuit for controlling decoding and displaying of subpicture information, in order to transfer and receive the subpicture information. Therefore, apparatuses which do not have complicated subpicture processing circuits cannot transfer subpicture information.

SUMMARY OF THE INVENTION

To solve the above problem, an objective of the present invention is to provide a transferring apparatus and method by which digital versatile disc (DVD) information can be transferred regardless of the function and configuration of an apparatus for receiving the transferred DVD information.

Another objective of the present invention is to provide an apparatus and method by which all apparatuses for receiving DVD information can view DVD information, by transferring DVD information after its transmission format has been appropriately altered according to the requirements of a user, the bandwidth of a transmission channel, and the information processing capability of an apparatus for receiving information (e.g., bit rate and existence or non-existence of a subpicture processing circuit), in order to provide the best quality of image and sound of the DVD information to a user.

To achieve the above objectives, there is provided an apparatus for transferring disc information to another apparatus, including: a stream format converter for providing a first stream by converting the program stream format of audio and video information read from the disc into a transport stream format; a re-encoder for providing a second stream by overlaying video information read from the disc with subpicture information read from the disc and re-encoding the overlaid information using a predetermined compression encoding scheme for image information; and a stream selector for selecting either the first or second stream according to the requirements of a user, the bandwidth of a transmission channel, and the information processing capability of an apparatus for receiving information, and transferring a selected stream to the apparatus for receiving information via a transmission channel.

To achieve the above objectives, there is provided a method of transferring disc information to another apparatus, including: (a) providing a first stream by converting from a program stream format of audio and video information read from a disc into a transport stream format; (b) providing a second stream by overlaying video information read from the disc with subpicture information read from the disc and re-encoding the overlaid information using a predetermined compression encoding scheme for image information; and (c) selecting either the first or second stream according to the requirements of a user, the bandwidth of a transmission channel, and the information processing capability of an apparatus for receiving information, and transferring a selected stream to the apparatus for receiving information via a transmission channel.

BRIEF DESCRIPTION OF THE DRAWINGS

The above objectives and advantages of the present invention will become more apparent by describing in detail a preferred embodiment thereof with reference to the attached drawings in which:

FIG. 2 is a view illustrating an example of the sequence of frames which are transferred via a TS packet selector when a stream to be transferred is switched from the output stream of the video encoder of FIG. 1 to the output stream of the PS/TS convertor of FIG. 1; and FIG. 3 is a view illustrating an example of the sequence of frames which are transferred via a TS packet selector when a stream to be transferred is switched from the output stream of the PS/TS convertor of FIG. 1 to the output stream of the video encoder of FIG. 1.

DESCRIPTION OF THE PREFERRED EMBODIMENT

Figure 1:
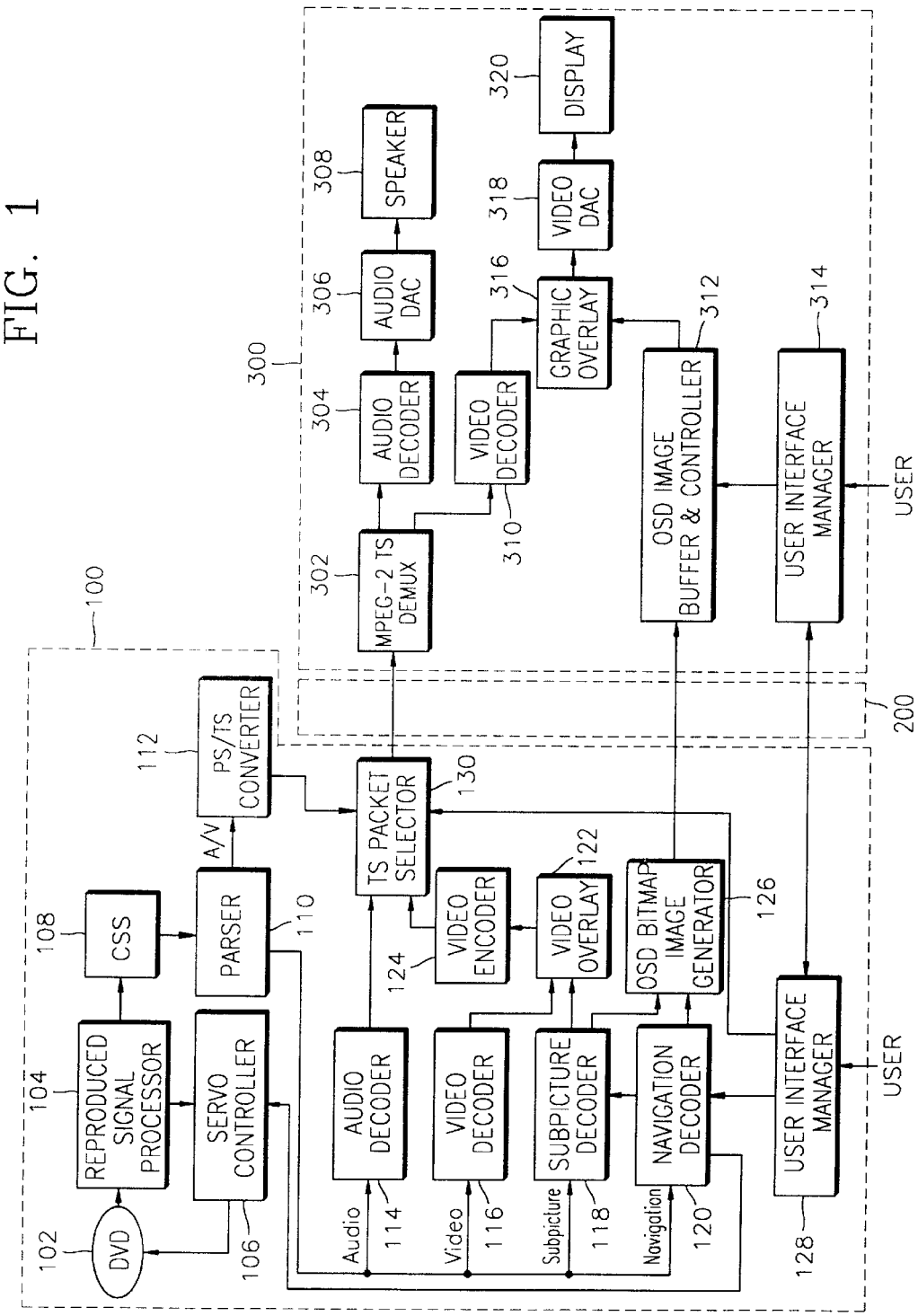
FIG. 1 is a block diagram illustrating a digital versatile disc (DVD) information transferring apparatus according to an embodiment of the present invention.

Referring to FIG. 1, a reproduced signal processor 104 in a digital versatile disc (DVD) player 100 includes a pickup unit for picking up a signal reproduced from a disc 102, a radio frequency (RF) amplifier for amplifying an RF signal which has been picked up by the pickup unit, and a digital signal processor for demodulating a modulated signal supplied from the RF amplifier, compensating for the phase of demodulated data by means of a phase locked loop (PLL) using a detected synchronizing signal, and performing descrambling and error detection/correction. The configuration and operation of the reproduced signal processor 104 are well known.

A servo controller 106 controls the rotation of a disc and the focusing and tracking of the pickup unit in order for data on the disc 102 to be accurately read according to the reproduced signal associated with a servo control, which is supplied from the reproduced signal processor 104.

Data supplied from the reproduced signal processor 104 may be data-scrambled to prevent digital copying, according to the purpose of a disc. In this case, the data supplied from the reproduced signal processor 104 is descrambled by a content scramble system (CSS) decoder 108. A descrambled stream is a program stream which is prescribed in MPEG. The program stream is constituted of a video pack having an MPEG-1 or MPEG-2 format, an audio pack having an MPEG, audio coding (AC)-3 or linear pulse code modulation (LPCM) format, a subpicture pack, and a navigation pack. In the present invention, a video pack, an audio pack and a compression coding scheme are described as an MPEG-2 format unless otherwise specified.

Here, the navigation pack includes a variety of information capable of controlling a bit stream, for example, menu button information, highlight information, information for angle selection, disc search information and others. Also, image information on the display of subtitles, menus or the like is included in the subpicture pack. A menu is displayed with reference to screen control information from the navigation pack, which includes the position and color of a button, the number of buttons, the color of a menu item selected, and the color of a menu item executed.

A parser 110 parses a program stream (PS) supplied from the CSS decoder 108, and provides audio/video (A/V) packs to a PS/TS converter 112, an audio pack to an audio decoder 114, a video pack to a video decoder 116, a subpicture pack to a subpicture decoder 118, and a navigation pack to a navigation decoder 120. The PS/TS converter 112 converts the A/V packs from the parser 110 into an MPEG-2 TS format, and provides the resultant MPEG-2 TS packet to a TS packet selector 130.

In the meantime, the audio decoder 114, the video decoder 116, the subpicture decoder 118 and the navigation decoder 120 decode the audio pack, the video pack, the subpicture pack, and the navigation pack, respectively. Here, the audio decoder 114 decodes the received audio pack, converts a decoded audio signal into a TS format, and provides the resultant audio TS to the TS packet selector 130. Alternatively, the audio decoder 114 converts the received audio pack into a TS format without decoding the received audio pack, and provides the resultant audio TS to the TS packet selector 130.

A video overlay 122 produces an image in units of a frame to be finally displayed for users, by overlaying the decoded video signal from the video decoder 116 and the decoded subpicture image information from the subpicture decoder 118, and provides the image frames to a video encoder 124. The video encoder 124 compresses and encodes the image frames using an appropriate compression encoding scheme for the image information, such as, MPEG-2 or DV, and then produces MPEG-2 TS packets and provides them to the TS packet selector 130.

Here, the PS/TS converter 112 can be referred to as a stream format converter, the video decoder 116, the subpicture decoder 118, the video overlay 122 and the video encoder 124 can be referred to as a re-encoder, and the TS packet selector 130 can be referred to as a stream selector.

The subpicture decoder 118 forms a subpicture image with a subpicture pack according to the highlight information and color pallette information from the navigation decoder 120, and provides the image information on the subpicture to the video overlay 122 and an on screen display (OSD) bitmap image generator 126.

The navigation decoder 120 decodes information in the navigation pack provided from the parser 110, and controls operations such as menu navigation or data search according to command data which corresponds to a user input which is provided via a user interface manager 128 in the DVD player 100 for producing command data which corresponds to a user key input which has been received via the remote controller or front panel of the DVD player 100 or via a user interface manager 314 in a DTV 300. That is, the navigation decoder 120 supplies a command to produce an OSD menu in the DVD player 100 to the OSD bit map image generator 126, or controls the servo controller 106 for controlling data search.

Here, command data which is provided via the user interface manager 314 of the DTV 300 is supplied to the user interface manager 128 of the DVD player 100 via a transmission channel 200 such as an IEEE 1394 asynchronous channel.

Also, the navigation decoder 120 transmits highlight information and color pallette information among user information received via the user interface managers 128 and 314, thereby controlling the subpicture decoder 118 so that the subpicture pack is accurately decoded.

The OSD bitmap image generator 126 converts the subpicture image provided from the subpicture decoder 118 into an OSD bitmap image format, and transmits the resultant OSD bitmap image information together with information associated with the control of the screen of a subpicture, via the transmission channel 200 such as an IEEE 1394 isochronous channel. Also, the OSD bitmap image generator 126 can produce an appropriate OSD bitmap image to be displayed to users according to a predetermined method, by receiving the command to produce the OSD menu in the DVD player 100 from the navigation decoder 120, and then transmit the produced OSD bitmap image to the transmission channel 200.

Screen control information with respect to a subpicture includes the format in which control information is transmitted in units of a pixel, and is constituted of information associated with which portion among transmitted subpicture information is to be represented in which color at which location on a screen. Also, the bitmap image information and screen control information with respect to a subpicture, which are provided from the OSD bitmap image generator 126, is formatted in a predetermined format which enables it to be transmitted to another apparatus (here, DTV).

The TS packet selector 130 selects either video information and audio information (hereinafter, referred to as a first stream) which are provided from the video encoder 124 and the audio decoder 114, respectively, or video and audio information (hereinafter, referred to as a second stream) which is provided from the PS/TS converter 112, and transmits selected information to the transmission channel 200.

When the TS packet selector 130 switches a stream to be transmitted from one stream among the first and second streams to the other stream at an arbitrary point in time, information on a frame of the newly-selected stream is transmitted before information corresponding to a picture (here, frame) of video and audio from the previously-selected stream could be completely transmitted. Thus, the video and audio information is damaged, and the damaged video and audio information is displayed. To prevent the above problem, upon switching from one stream among two streams to the other stream, information corresponding to a new frame in the newly-selected stream must be transmitted after information corresponding to a frame of video and audio in the previously-selected stream is completely transmitted. Thus, each of the PS/TS converter 112, the audio decoder 114 and the video encoder 124 must inform the TS packet selector 130 of the starting of information corresponding to a new frame.

That is, the PS/TS converter 112 informs the TS packet selector 130 of when a new video frame starts, when MPEG-2 PS packs are converted into MPEG-2 TS packets. That is, when a new picture-start-code is searched through searching of the internal image information by the PS/TS converter 112 while the MPEG-2 TS packet is being produced, the PS/TS converter 112 transmits a control signal (a first picture start signal) representing the output of a TS packet including the new picture-start-code to the TS packet selector 130, when the TS packet is output. Also, the PS/TS converter 112 also produces a control signal (picture discrimination signal) representing which frame a currently-output frame corresponds to in a group of picture (GOP) and whether the currently-output frame is an infra (I) frame, a predictive (P) frame or a bidirectionally predictive (B) frame, with reference to picture header information, and then transmits the produced control signal to the TS packet selector 130.

The video encoder 124 compresses and encodes image information in units of a frame from the video overlay 122 using a compression encoding scheme for image information such as MPEG-2, and converts the resultant information into an MPEG-2 TS packet format and transmits the same to the TS packet selector 130. At this time, similar to the PS/TS converter 112, the video encoder 124 transmits a control signal (a second picture start signal) representing the output of the first packet of a new frame to the TS packet selector 130 with reference to the picture header information, when the first packet is output.

The TS packet selector 130 selects either the first stream output from the PS/TS converter 112 or the second stream output from the audio decoder 114 and the video encoder 124. Upon switching from one stream to the other stream, frame transmission for the newly-selected stream must start when a new picture start signal of the newly-selected stream is received after the frame transmission of one frame is completely finished using the first and second picture start signals.

For example, when a stream switch control command for switching from the first stream to the second stream is received from the user interface manager 128 for the DVD player 100 or the user interface manager 314 for the DTV 300, the TS packet selector 130 stops transferring the first stream when the first picture start signal is supplied from the PS/TS converter 112, and starts transferring the second stream when the second picture start signal indicating the start of a new frame is supplied from the video encoder 124.

A frame buffer is installed in each of the PS/TS converter 112 and the video encoder 124, and the storage size of the frame buffer can be appropriately controlled so that the frames of the first and second streams provided from the PS/TS converter 112 and the video encoder 124 are input to the TS packet selector 130 at nearly the same point in time. If the output of the PS/TS converter 112 leads the output of the video encoder 124 by about two frames, a frame buffer capable of storing image information of about two frames is installed in the PS/TS converter 112, and thus controls the PS/TS converter 112 to output a frame at the same time as when the frame is output from the video encoder 124.

When the video encoder 124 uses a method of re-encoding only an MPEG-2 I picture, if the first stream from the PS/TS converter 112 is selected and transferred by the TS packet selector 130, and in the meantime, the second stream from the video encoder 124 is then selected to be transferred, a problem concerning the order of frames occurs. Also, when the second stream is first selected and then the selection of the second stream is switched to the first stream, the same problem occurs.

First, the reasons that problems occur when the second stream from the video encoder 124 is first transferred, and then the first TS packet stream from the PS/TS converter 112 is transferred, will now be described.

Video information stored in a DVD includes I, P and B frames compressed by the MPEG-2 technique. In order to decode P or B frames, the information of a previous frame is required for motion compensation. When the second stream from the video encoder 124, which has only I frames, is transferred, and then the first stream from the PS/TS converter 112, which has P or B frames, is transferred, the order of frames is not consistent with the original order of frames. Thus, a receiving side may not decode the frames.

Assuming that the first frame is an I frame, the fourth frame is a P frame, and the second and third frames are B frames, frames are transferred from the PS/TS converter 112 to the TS packet selector 130 in the order of the first frame, the fourth frame, the second frame, and the third frame. However, frames from the video encoder 124 for re-encoding only I pictures are transferred to the TS packet selector 130 in the original order, that is, in the order of the first frame, the second frame, the third frame and the fourth frame. Accordingly, when the information of the first and second frames from the video encoder 124 is transferred via the TS packet selector 130, and then the second and third frames from the PS/TS converter 112 is transferred, the decoders in the DTV 300 receive the second frame twice and no fourth frame. Considering the order of frames, it becomes evident that the switching between streams can be done after each group of P, B and B frames. That is, as shown in FIG.

2, when the switching between streams is done after a B frame such as the third, sixth, ninth and twelfth frames, frames are contiguously transferred without overlap transfer or non-transfer.

A frame supplied from the video encoder 124 is overlaid by a subpicture. When the frame overlaid by the subpicture is transmitted, and then the output of the PS/TS converter 112 is immediately transferred, the subpicture continuously appears over several frames due to motion compensation. Thus, in this case, switching between streams must be done only when a new GOP starts, in order to solve this problem. That is, the influence of a subpicture on frames of one stream upon frames of the other stream when a stream to be transferred is switched from one stream to the other stream is removed by an I frame included in a new GOP, in contrast to the prior art.

Even though switching between streams is done in units of a GOP, in terms of time, when an I frame is set to be a zero-th frame, the frame (B) immediately prior to the I frame, and the frame (B) two frames prior to the I frame usually pertain to the same GOP to which the I frame pertains. However, these B frames are produced by motion compensation using the frame (P) three frames prior to the zero-th frame (I frame) of the current GOP (this P frame pertaining to the previous GOP) and the zero-th frame (I frame) of the current GOP. Thus, if there is a subpicture in the frame (P), this subpicture also appears over the frame (B) two frames prior and the frame (B) immediately prior to the zero-th frame of the current GOP.

Therefore, the video encoder 124 also encodes the frame (B) two frames prior and the frame (B) immediately prior to the zero-th frame (I frame) into I frames and then transfers the I frames, and then the PS/TS converter 112 excludes all information corresponding to the two B frames within the current GOP and then transfers the next frames. In this way, the subpicture in the previous GOP is removed, and thus original information can be transferred.

In FIG. 2, (a) illustrates the order of frames of the second stream from the video encoder 124, (b) illustrates the order of frames of the first stream from the PS/TS converter 112, and (c) illustrates the order of frames output from the TS packet selector 130 when a stream to be transferred is switched from the second stream into the first stream. In FIG. 2, a GOP is shown in the form of |*--*|. It can be seen from FIG. 2 that the TS packet selector 130 transfers I frames of the second stream, which corresponds to a GOP, from the video encoder 124, further transfers another two I frames instead of the fourteenth and fifteenth B frames of a new GOP, and then transfers the sixteenth I frame and the nineteenth P frame by skipping the fourteenth and fifteenth B frames provided from the PS/TS converter 112.

On the other hand, when the first stream from the PS/TS converter 112 is selected by the TS packet selector 130 and transferred, and then the second stream from the video encoder 124 for re-encoding I pictures is selected and transferred, no problems due to motion compensation are generated. However, the order of frames must be considered in order to provide to users moving pictures which are smoothly connected to each other. That is, as shown in FIG. 3, when the first stream from the PS/TS converter 112 is transferred, and then the second stream from the video encoder 124 is transferred, the second, fifth, eighth, eleventh and fourteenth frame information of the second stream from the video encoder 124 starts being transferred after the first I frame, third B frame, sixth B frame, ninth B frame and twelfth B frame of the first stream, respectively. From this, it can be seen that the frames of the first and second streams are connected to each other in accordance with the order of frames.

That is, FIG. 3(a) illustrates the order of frames of the first stream from the PS/TS converter 112, FIG. 3(b) illustrates the order of frames of the second stream from the video encoder 124, and FIG. 3(c) illustrates the order of frames output from the TS packet selector 130 when a stream to be transferred is switched from the first stream to the second stream. FIG. 3 shows an example in which the TS packet selector 130 transfers a GOP of the first stream from the PS/TS converter 112, and immediately transfers a new GOP of the second stream from the video encoder 124.

As shown in FIG. 1, in apparatus for receiving DVD information, that is, in the DTV 300 capable of delivering information such as MPEG-2 TS information to viewers, an MPEG-2 TS demultiplexer (DEMUX) 302 demultiplexes a stream, which is supplied from the TS packet selector 130 via the transmission channel 200 such as an IEEE 1394 isochronous channel, into a video stream and an audio stream.

An audio decoder 304 decodes the audio stream from the MPEG-2 TS DEMUX 302 and outputs the decoded audio stream at a time which depends on an MPEG-2 audio format. An audio digital-to-analog converter (DAC) 306 converts the decoded audio signal into an analog audio signal, and the analog audio signal is output via a speaker 308.

A video decoder 310 decodes the video stream from the MPEG-2 TS DEMUX 302 and outputs the decoded video stream at a time which depends on an MPEG-2 video format.

An OSD image buffer & controller 312 controls a graphic overlay 316 so that a bit map image is displayed on a corresponding area of a screen at a predetermined time according to OSD bitmap image information and screen control information which are provided from the OSD bitmap image generator 126 via the transmission channel 200 such as an IEEE 1934 asynchronous channel.

The graphic overlay 316 performs a simple function for outputting graphic information on a screen, and also overlaps the subpicture OSD bitmap image information which is transferred from the DVD player 100 via the transmission channel 200 with a video signal decoded by the video decoder 310, while synchronizing the subpicture OSD bitmap image information with the decoded video signal and matching the position therebetween according to the screen control information transferred via the transmission channel 200. The overlaid video signal is displayed on a display 320 via a video DAC 318.

In the prior art, the user interface manager 314 only controls a corresponding apparatus. However, in the present invention, the user interface manager 314 can also control DVD information by receiving even a command associated with a different apparatus such as a DVD player from a user and transferring the command to the DVD player.

In another embodiment of the present invention, the OSD bitmap image generator 126 shown in FIG. 1 may be omitted. In this case, when there is no subpicture information, video and audio information is transferred via the PS/TS converter 112, but when there is subpicture information, video and subpicture image information obtained from the video decoder 116 and the subpicture decoder 118 are overlaid by the video overlay 122, re-encoded by the video encoder 124, and then transferred. At this time, when subpicture information must be displayed, the TS packet selector 130 selects the output of the video encoder 124. In normal cases, the TS packet selector 130 selects and outputs the output of the PS/TS converter 112 to provide a picture having a high image quality.

Hence, between the DVD player and an apparatus for receiving DVD information, some matters must be previously discussed and determined. That is, according to the demands of a user, the bandwidth of a transmission channel, and the information processing capability (bit rate and existence or non-existence of a subpicture processing circuit) of the apparatus for receiving DVD information, an optimal transfer method must be determined. That is, a determination as to whether the output from the PS/TS converter 112 or the output from the video encoder 124 is to be transferred must be made. Also, a determination as to whether the video encoder 124 is to perform either MPEG-2 full re-encoding, MPEG-2 I picture re-encoding, or DV-format re-encoding must be made, and a transmission channel must be discussed and selected.

However, as described above referring to FIG. 1, switching from one stream to the other stream in compliance with a user's request can be achieved only in units of a GOP (about 0.5 seconds). Accordingly, when subtitles are changed two or more times per second while the subtitle is being viewed using a subpicture, it is difficult to alternately transfer two streams. In this case, application is possible. For example, the output from the video encoder 124 is selected only when a menu screen is operated. That is, when a user turns a caption mode on, the output of the video encoder 124 is output, but when the user turns the caption mode off, the output of the PS/TS converter 112 is output.

As still another embodiment, also when the video encoder 124 is an MPEG-2 full encoder for supporting all I, P and B frames, information can be transferred in the same frame order as that described above.

In an embodiment of the present invention, an information transmission device depending on an IEEE 1394 transfer standard is used as a transmission channel to transfer digital video and audio information, which is stored on a DVD, to another apparatus, so that the apparatus which receives the digital video and audio information in DVD can provide high image quality and sound quality without deterioration. At this time, the transmission channel transfers video and audio information in a suitable format depending on the type of video and audio information to be transferred, so that it can be used to connect a variety of apparatuses to a DVD apparatus in a digital format.

When a current digital TV transmission channel standard such as a 8 vestigial side band (8-VSB) channel is used as a transmission channel, the bandwidth for transmission is limited. Furthermore, when information is transferred after undergoing MPEG-2 I picture re-encoding, the compression ratio is lowered, and thus the bandwidth increases. Thus, the information cannot be transferred via the 8-VSB channel. However, in the present invention, when original DVD information is transferred after only its stream format is converted into a TS packet, the bandwidth is hardly changed. Thus, in the present invention, the 8-VSB channel can be used for transmission. The transmission via the 8-VSB transmission channel does not require an IEEE 1394 interface, so that cost is reduced, and any type of DTV can be connected. However, this case limits the transmission of subpictures.

In summary, in the present invention, when MPEG-2 I picture re-encoded DVD information is transferred, a wide bandwidth and rapid information processing are required due to a low compression ratio, and the image quality is deteriorated, but a subpicture can be completely expressed. On the other hand, when DVD information is transferred using an MPEG-2 PS/TS converter, the bandwidth of original information can be maintained, so that a wide bandwidth and rapid information processing are not required. Also, the quality of image does not degrade. However, in order to express subpictures, a circuit is required to convert subpictures into OSD bitmap images, and some bandwidth is needed for the transmission of subpictures. In particular, when subpictures are transferred via an IEEE 1394 asynchronous channel, the synchronization between a video and a subpicture cannot be guaranteed, so that there may be a limit in displaying a subpicture on a screen.

In the present invention, if the two methods are used by being appropriately switched according to the requirements of a user, the bandwidth of a transmission channel, and the information processing capability of an apparatus for receiving information, video and audio information in a DVD can be always viewed regardless of the information processing capability of an apparatus for receiving DVD information, the bandwidth of a transmission channel, or the like. That is, if an apparatus for receiving DVD information has a rapid information processing speed and a transmission channel has sufficient bandwidth, when a subpicture is necessary, the output stream of the video encoder 124 for re-encoding only I pictures is transferred, and on the other hand, in normal cases, the output stream of a PS/TS converter can be transferred. Also, even if the above conditions are not satisfied, at least video and audio information can be displayed to users without a degradation in picture quality, by using the PS/TS converter. In this case, expression of subpictures may be limited to a certain extent.

Also, in the present invention, when high definition image information is stored in a DVD, a transmission channel must have a wide bandwidth and an apparatus for receiving information must process information rapidly in order to transfer the high definition image information using I picture re-encoding. When a subpicture must be transferred while these conditions are satisfied, the output stream of a video encoder using I picture re-encoding is transferred. When a subpicture does not need to be transferred, the output stream of a PS/TS converter is transferred, so that information can be transferred without a degradation in image quality. When the above-described conditions are not satisfied, expression of subpictures is limited, but the output stream of the PS/TS converter can be transferred. Here, a determination as to which stream an apparatus for receiving DVD information is to receive can be made in consideration of the information processing capability of the apparatus for receiving DVD information, the bandwidth of a transmission channel, and others, prior to transmission.

As described above, in the present invention, information is transferred using an optimal transfer method selected in accordance with the requirements of a user, the bandwidth of a transmission channel, and the information processing capability of an information receiving apparatus, that is, MPEG-2 full re-encoding, MPEG-2 I picture re-encoding, DV format re-encoding, or conversion of information stored in an original DVD into an MPEG-2 TS packet. Therefore, even if DVD information is transferred to any apparatus, it can be viewed.

What is claimed is:

1. An apparatus for transferring disc information to another apparatus, comprising:
a stream format converter for providing a first stream by converting the program stream format of audio and video information read from the disc into a transport stream format;

a re-encoder for providing a second stream by overlaying video information read from the disc with subpicture information read from the disc and re-encoding the overlaid information using a predetermined compression encoding scheme for image information; and a stream selector for selecting either the first or second stream according to the requirements of a user, the bandwidth of a transmission channel, and the information processing capability of an apparatus for receiving information, and transferring a selected stream to the apparatus for receiving information via a transmission channel.

2. The transferring apparatus of claim 1, wherein the predetermined compression encoding scheme for image information is moving picture experts group (MPEG)-2 full re-encoding, MPEG-2 intra picture re-encoding, or digital video format re-encoding.

3. The transferring apparatus of claim 1, wherein the transfer standard of the transmission channel is an IEEE 1394 interface or an 8 vestigial side band (8-VSB).

4. The transferring apparatus of claim 1, wherein the disc is a digital versatile disc (DVD).

5. The transferring apparatus of claim 4, wherein a stream to be selected by the stream selector, and the optimal compression encoding scheme for image information to be used by the re-encoder, are previously determined by a negotiation between a DVD apparatus for transferring the DVD information and an apparatus for receiving the DVD information.

6. The transferring apparatus of claim 1, wherein the stream selector selects the second stream only when a user wants a subpicture to be displayed, and selects the first stream in the other cases.

7. The transferring apparatus of claim 1, wherein the stream format converter supplies a first picture start signal and a picture discrimination signal to the stream selector by analyzing picture header information of video information read from the disc, the re-encoder supplies a second picture start signal to the stream selector by analyzing the picture header information of video information read from the disc, and the stream selector selects either the first or second stream in units of at least one frame information in synchronization with the first and second picture start signals according to a received stream switching control command.

8. The transferring apparatus of claim 7, wherein when the stream selector receives the stream switching control command for switching from the first stream to the second stream or from the second stream to the first stream, the stream selector provides a continuous, uninterrupted image by performing switching after a group of P, B and B pictures of the first stream in consideration of the order of frames.

9. The transferring apparatus of claim 7, wherein when the second stream is overlaid by a subpicture and the stream selector receives the stream switching control command for switching from the second stream to the first stream, the stream selector performs switching only when a new group of picture (GOP) starts, and when a new GOP of the first stream starts with bidirectionally predictive (B) pictures which are affected by the last picture within a previous GOP of the second stream, intra pictures of the second stream are further transferred, and then in a new GOP, the first stream is transferred with the exception of the B pictures which are affected by the last picture within the previous GOP.

10. The transferring apparatus of claim 1, wherein each of the stream format converter and the re-encoder has a picture buffer, such that the stream format converter and the re-encoder provide the first and second streams to the stream selector at nearly the same time when the stream selector switches from one stream to the other stream.

11. The transferring apparatus of claim 1, further comprising an on screen display (OSD) bitmap image generator for converting a subpicture image read from the disc into an OSD bitmap image and providing the OSD bitmap image information and screen control information for a subpicture to the transmission channel.

12. The transferring apparatus of claim 1, wherein the apparatus for receiving information is a digital television, and comprises:

a demultiplexer for demultiplexing a stream received from the stream selector via the transmission channel, into a video stream and an audio stream;

an audio decoder for decoding the audio stream and providing a decoded audio signal;

a video decoder for decoding the video stream and providing a decoded video signal;

an OSD image controller for controlling the OSD bitmap image information received via the transmission channel to be expressed on a corresponding area of a screen according to the screen control information at a predetermined time; and a graphic overlay for overlaying the decoded video signal with the OSD bitmap image information under the control of the OSD image controller.

13. A method of transferring disc information to another apparatus, comprising:

(a) providing a first stream by converting from a program stream format of audio and video information read from a disc into a transport stream format;

(b) providing a second stream by overlaying video information read from the disc with subpicture information read from the disc and re-encoding the overlaid information using a predetermined compression encoding scheme for image information; and (c) selecting either the first or second stream according to the requirements of a user, the bandwidth of a transmission channel, and the information processing capability of an apparatus for receiving information, and transferring a selected stream to the apparatus for receiving information via a transmission channel.

14. The transferring method of claim 13, wherein the predetermined compression encoding scheme for image information is moving picture experts group (MPEG)-2 full re-encoding, MPEG-2 intra picture re-encoding, or digital video format re-encoding.

15. The transferring method of claim 13, wherein the transfer standard of the transmission channel is an IEEE 1394 interface or an 8 vestigial side band (8-VSB).

16. The transferring method of claim 13, wherein the disc is a digital versatile disc (DVD).

17. The transferring method of claim 16, wherein the stream selection and the predetermined compression encoding scheme for image information are previously determined by a negotiation between a DVD apparatus for transferring the DVD information and an apparatus for receiving the DVD information.

18. The transferring method of claim 13, wherein in the step (c), the stream selector selects the second stream only when a user wants a subpicture to be displayed, and selects the first stream in the other cases.

19. The transferring method of claim 13, wherein in the step (c), either the first or second stream is selected in units of at least one frame information according to a received stream switching control command.

20. The transferring method of claim 19, wherein in the step (c), when the stream switching control command for switching from the first stream to the second stream or from the second stream to the first stream is received, a continuous, uninterrupted image is provided by performing switching after a group of P, B and B pictures of the first stream in consideration of the order of pictures.

21. The transferring method of claim 19, wherein in the step (c), when the second stream is overlaid by a subpicture and the stream switching control command for switching from the second stream to the first stream is received, switching is performed only when a new group of picture (GOP) starts, and when a new GOP of the first stream starts with bidirectionally predictive (B) pictures which are affected by the last picture within a previous GOP of the second stream, intra pictures of the second stream are further transferred, and then in a new GOP, the first stream is transferred with the exception of the B pictures which are affected by the last picture within the previous GOP.

22. The transferring method of claim 13, further comprising (d) converting a subpicture image read from the disc into an OSD bitmap image, and transferring the OSD bitmap image to the transmission channel.

* * * * *